United States Patent
Bojjanapalli et al.

(10) Patent No.: US 11,591,929 B2
(45) Date of Patent: Feb. 28, 2023

(54) SENSOR ASSEMBLIES, GAS TURBINES WITH SENSOR ASSEMBLIES, AND METHODS OF COOLING SENSOR ASSEMBLIES

(71) Applicant: Rosemount Aerospace, Inc., Burnsville, MN (US)

(72) Inventors: Muralidhar Rao Bojjanapalli, Telangana (IN); Venkatasubramanian Chockalingamaharaja, Bangalore (IN)

(73) Assignee: ROSEMOUNT AEROSPACE, INC., Burnsville, MN (US)

( * ) Notice: Subject to any disclaimer, the term of this patent is extended or adjusted under 35 U.S.C. 154(b) by 705 days.

(21) Appl. No.: 16/653,189

(22) Filed: Oct. 15, 2019

(65) Prior Publication Data
US 2021/0047939 A1  Feb. 18, 2021

(30) Foreign Application Priority Data
Aug. 16, 2019 (IN) .............................. 201911033142

(51) Int. Cl.
*G01K 13/024* (2021.01)
*F01D 25/12* (2006.01)
(Continued)

(52) U.S. Cl.
CPC ........... *F01D 25/12* (2013.01); *G01D 11/245* (2013.01); *G01D 11/30* (2013.01); *G01K 1/08* (2013.01);
(Continued)

(58) Field of Classification Search
CPC .... G01D 11/30; G01D 11/245; G01K 13/024; G01K 1/08; G01K 1/12; G01K 1/14
See application file for complete search history.

(56) References Cited

U.S. PATENT DOCUMENTS

| 8,052,484 B1 | 11/2011 | Salisbury et al. |
| 8,742,944 B2 | 6/2014 | Mitchell et al. |

(Continued)

FOREIGN PATENT DOCUMENTS

| EP | 2485023 A2 * | 8/2012 | ............... G01K 1/08 |
| EP | 2485023 A2 | 8/2012 | |

(Continued)

OTHER PUBLICATIONS

European Search Report Application No. EP19212839; dated Jul. 10, 2020; pp. 8.

(Continued)

*Primary Examiner* — Jamel E Williams
(74) *Attorney, Agent, or Firm* — Cantor Colburn LLP (57) ABSTRACT

A sensor assembly includes a housing defining a potting chamber and arranged along a sensor axis, a mounting flange extending about the sensor axis the axially offset along the sensor axis from the housing, and one or more intermediate flange. The one or more intermediate flange is arranged between the housing and the mounting flange along the sensor axis, the one or more intermediate flange coupling the mounting flange to the housing. The one or more intermediate flange is spaced apart from mounting flange to limit thermal communication between the mounting flange and the housing. Gas turbine engines and methods of cooling sensor assemblies are also described.

19 Claims, 6 Drawing Sheets

(51) Int. Cl.
    *G01K 1/12*     (2006.01)
    *G01K 1/14*     (2021.01)
    *G01D 11/24*     (2006.01)
    *G01D 11/30*     (2006.01)
    *G01K 1/08*     (2021.01)

(52) U.S. Cl.
    CPC ............... *G01K 1/12* (2013.01); *G01K 1/14* (2013.01); *G01K 13/024* (2021.01); *F05D 2220/32* (2013.01); *F05D 2260/221* (2013.01)

(56) References Cited

U.S. PATENT DOCUMENTS 10,151,486 B2 *   12/2018   Sandoval ............... F23R 3/005
2004/0083817 A1 *   5/2004   Nomura ............... G01D 11/30
                                                                            73/756
2018/0321088 A1 *   11/2018   Martinez ............... G01K 1/08

FOREIGN PATENT DOCUMENTS

WO           2013028819 A1     2/2013
WO     WO-2013028819 A1 *   2/2013   ........... F01D 17/085

OTHER PUBLICATIONS

Search Report Issued in European Application No. 19212839.5; Application Filing Date Dec. 2, 2019; dated Mar. 14, 2022 (7 pages).

* cited by examiner

SENSOR ASSEMBLIES, GAS TURBINES WITH SENSOR ASSEMBLIES, AND METHODS OF COOLING SENSOR ASSEMBLIES

CROSS-REFERENCE TO RELATED APPLICATIONS

This application claims the benefit of Indian Patent Application 201911033142 filed Aug. 16, 2019, the disclosure of which is incorporated herein by reference in its entirety.

BACKGROUND

The present disclosure is generally related to sensor assemblies, and more particularly sensor assemblies and methods of cooling sensor assemblies in high temperature applications.

Gas turbine engines, such as aircraft main engines and auxiliary power units, commonly employ sensors to monitor various parameters during operation of the gas turbine engine. For example, flow sensors may be employed to monitor flow through the engine compressor section and/or turbine section. Pressure sensors may also be employed to monitor pressure of flows through the engine compressor section and/or turbine section. In addition, temperature sensors may be employed to measure temperature within the compressor and/or the turbine section. Such sensors are generally positioned in proximity to hot engine structures and therefore undergo heating due to the proximity to the hot engine structure.

In some gas turbine engines sensors may be subjected to temperatures above the rating of standard electrical connectors. Applications where the sensor is exposed to temperatures above that of the sensor rating typically requires customization of the electrical connector interfacing the sensor to external devices, such as with ceramic buttons and stainless steel stud arrangements fixed to the sensor with brazing or welding. While generally acceptable for their intended purpose, brazing and ceramic structures can fracture due to the stress and fatigue associated with the heating. Further, high temperatures can lead to embrittlement of electrical leads within the sensor, potentially limiting reliability of such sensors.

Such systems and methods have generally been accepted for their intended purpose. However, there remains a need for improved sensor assemblies, gas turbine engines having sensor assemblies, and methods of cooling sensor assemblies.

BRIEF SUMMARY

A sensor assembly is provided. The sensor assembly incudes a housing defining a potting chamber and arranged along a sensor axis, a mounting flange extending about the sensor axis and axially offset along the sensor axis from the housing, and one or more intermediate flange. The one or more intermediate flange is arranged between the housing and the mounting flange along the sensor axis, couples the mounting flange to the housing, and is spaced apart from the mounting flange to limit thermal communication between the mounting flange and the housing.

In addition to one or more of the features described above, or as an alternative, further embodiments may include that the one or more intermediate flange is spaced apart from the housing to limit thermal communication between the mounting flange and the housing.

In addition to one or more of the features described above, or as an alternative, further embodiments may include two or more point standoffs connecting the one or more intermediate flange to the mounting flange, the plurality of point standoffs defining an inboard gap between the one or more intermediate flange and the mounting flange.

In addition to one or more of the features described above, or as an alternative, further embodiments may include that the two or more point standoffs are radially offset from the sensor axis.

In addition to one or more of the features described above, or as an alternative, further embodiments may include that the In addition to one or more of the features described above, or as an alternative, further embodiments may include that the two or more point standoffs are distributed circumferentially about the sensor axis.

In addition to one or more of the features described above, or as an alternative, further embodiments may include two or more arcuate standoffs connecting the one or more intermediate flange to the housing, the two or more arcuate standoffs defining an outboard chamber between the one or more intermediate flange and the housing.

In addition to one or more of the features described above, or as an alternative, further embodiments may include that the two or more arcuate standoffs are radially offset from the sensor axis.

In addition to one or more of the features described above, or as an alternative, further embodiments may include that the two or more arcuate standoffs are circumferentially distributed about the sensor axis, the circumferentially adjacent arcuate standoffs defining flow channels therebetween In addition to one or more of the features described above, or as an alternative, further embodiments may include an electrical connector axially opposite the one or more intermediate flange and connected to the housing.

In addition to one or more of the features described above, or as an alternative, further embodiments may include that the electrical connector is welded or brazed to the housing.

In addition to one or more of the features described above, or as an alternative, further embodiments may include that the electrical connector is a standard electrical connector, a circular electrical connector, or conforms to a MIL-STD specification.

In addition to one or more of the features described above, or as an alternative, further embodiments may include a temperature sensor fixed to the housing and extending along the sensor axis to a location on a side of the mounting flange opposite the one or more intermediate flange.

In addition to one or more of the features described above, or as an alternative, further embodiments may include a sensor fixed to the housing and extending along the sensor axis, at least one sensor lead extending from the sensor and disposed within the potting chamber of the housing, and a potting body supporting the at least one sensor lead and thermally coupling the at least one sensor lead to the housing.

A gas turbine engine is also provided. The gas turbine engine includes a case enclosing at least one of a compressor, a combustor, and a turbine. The gas turbine engine also includes a sensor assembly as described above, the mounting flange of the sensor assembly is fixed to the case and the housing in thermal communication with the case through the mounting flange, the sensor assembly further including standard electrical connector axially opposite the one or more intermediate flange and connected to the housing.

In addition to one or more of the features described above, or as an alternative, further embodiments may include that the sensor assembly further has two or more point standoffs connecting the mounting flange to the intermediate flange, the two or more point standoffs defining an inboard gap between the mounting flange and the one or more intermediate flange; and two or more arcuate standoffs connecting the intermediate flange to the housing, the two or more arcuate standoffs defining an outboard chamber between the one or more intermediate flange and the housing.

In addition to one or more of the features described above, or as an alternative, further embodiments may include that the sensor assembly additionally includes a temperature sensor fixed to the housing and extending along the sensor axis to a location on a side of the mounting flange opposite the one or more intermediate flange.

A method of cooling a sensor assembly is provided. The method includes, at a sensor assembly as described above, communicating heat to the mounting flange of the sensor assembly, thermally separating the one or more intermediate flange from the mounting flange with a fluid disposed between the mounting flange and the one or more intermediate flange, and thermally separating the housing from the one or more intermediate flange with additional fluid disposed between the intermediate flange and the housing.

In addition to one or more of the features described above, or as an alternative, further embodiments may include flowing the fluid between the mounting flange and the one or more intermediate flange, and flowing the additional fluid between the one or more intermediate flange and the housing.

In addition to one or more of the features described above, or as an alternative, further embodiments may include communicating a first portion of the heat to the one or more intermediate flange of the sensor assembly, and communicating a second portion of the heat to the housing of the sensor assembly, the second portion of the heat being smaller than the first portion of the heat.

In addition to one or more of the features described above, or as an alternative, further embodiments may include heating the mounting flange to a temperature of about 450 degrees Celsius (about 842 degree Fahrenheit), the method further comprising cooling the housing to a temperature of about 200 degrees Celsius (about 392 degree Fahrenheit).

Technical effects of the present disclosure are sensor assemblies for high temperature applications employing standard electrical connectors. In certain embodiments circular connectors conforming to a MIL-STD standard specification can be employed in applications where temperatures exceed that of the connector rating. In accordance with certain embodiments sensor assemblies described herein can have a relatively simple geometry, the sensor thereby being relatively inexpensive and suitable for fabrication using subtractive manufacturing techniques.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
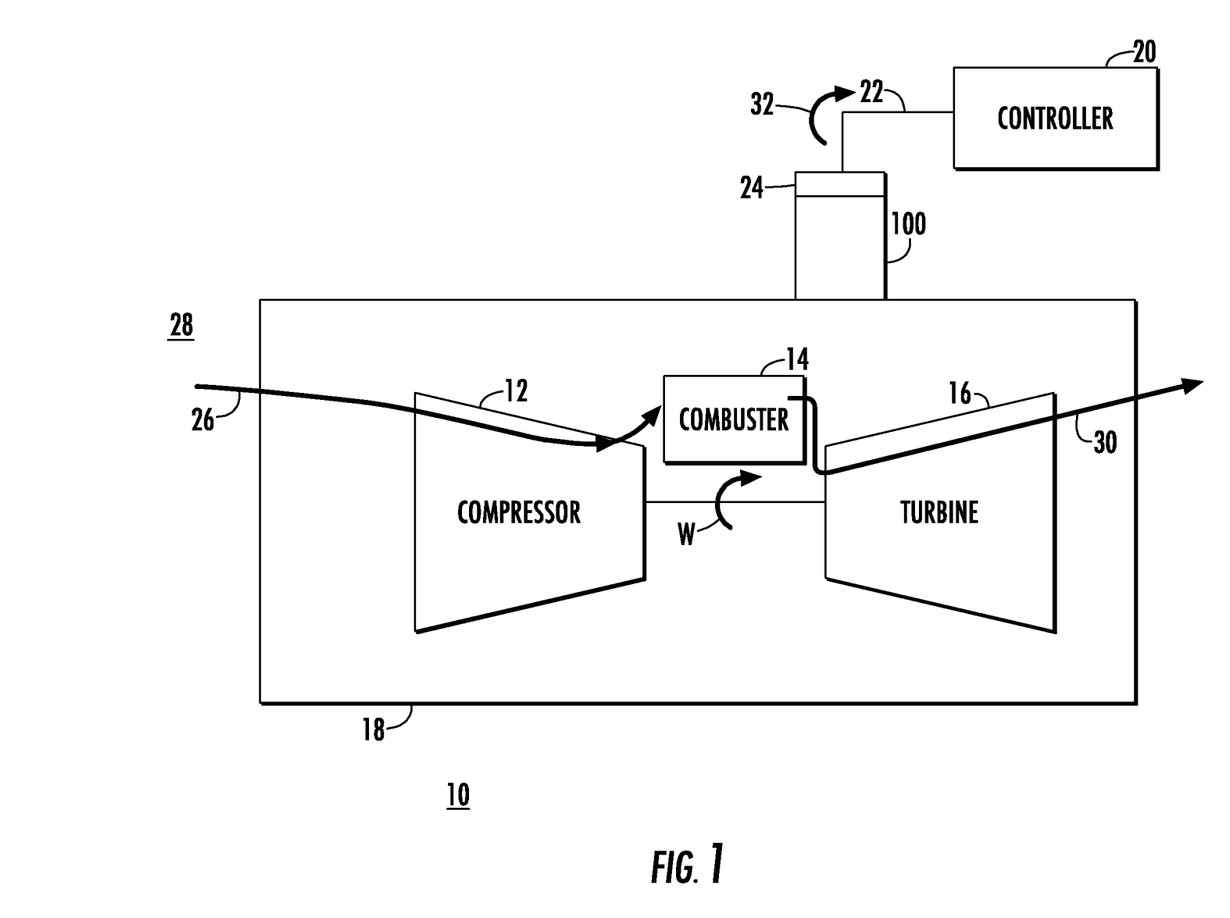
FIG. 1 is a schematic view of gas turbine having a sensor assembly according to the present disclosure, showing the sensor connected to a controller through a circular electrical connector conforming to a MIL-STD specification.

Reference will now be made to the drawings wherein like reference numerals identify similar structural features or aspects of the subject disclosure. For purposes of explanation and illustration, and not limitation, a partial view of an exemplary embodiment of a sensor assembly in accordance with the disclosure is shown in FIG. 1 and is designated generally by reference character 100. Other embodiments of sensor assemblies, gas turbine engines with sensor assemblies, and methods of cooling sensors in gas turbine engines in accordance with the present disclosure, or aspects thereof, are provided in FIGS. 2-6, as will be described. The systems and methods described herein can be used in sensors having standard electrical connectors in applications with temperature above the rating of the electrical connector, such as in gas turbine engines, through the present disclosure is not limited to gas turbine engines or to sensors employing any particular type of electrical connector.

Referring to FIG. 1, a gas turbine engine 10 is shown. The gas turbine engine 10 includes a compressor 12, a combustor 14, a turbine 16, and a case 18. The gas turbine engine 10 also includes a controller 20, an engine harness 22 with a harness connector 24, and a sensor assembly 100.

The compressor 12 is operably associated with the turbine 16 and is arranged to generate working fluid flow 26 using fluid ingested from the ambient environment 28. The combustor 14 is in fluid communication with the compressor 12 and is arranged to generate a flow of high pressure combustion products 30 using the working fluid flow 26, which the combustor 14 receives from the compressor 12. The turbine 16 is in fluid communication with combustor 14, is operably connected to the compressor 12, and is arranged to extract work W from the high pressure combustion products 30 received from the combustor 14. During operation the turbine 16 communicates a portion of the extracted W to the compressor 12, which the compressor 12 uses to generate the working fluid flow 26. The controller 20 is operably connected to the gas turbine engine 10 to control operation of the gas turbine engine 10. In certain embodiments the controller is a full authority digital engine controller, an electronic engine controller, or an engine control unit.

As will be appreciated by those of skill in the art in view of the present disclosure, the controller 20 can require information relating to one or more operating parameters of the gas turbine engine 10. For example, the controller 20 may require information relating to one or more of: temperature; pressure; and/or fluid flow within the gas turbine engine 10. To provide the information required by the controller 20 the sensor assembly 100 is connected to the case 18, is disposed in communication with the controller 20 through the engine harness 22, and is configured to provide a signal 32 indicative of an operating parameter to the controller 20. Communication with the controller 20 occurs through the harness connector 24, which is mechanically connected to the sensor assembly 100, and is arranged to communicate a signal 32 generated by the sensor assembly 100 to the controller 20.

As will also be appreciated by those of skill in the art in view of the present disclosure, the sensor assembly 100 be exposed to relatively high temperatures, e.g., temperatures in excess of 200 degrees Celsius (392 degree Fahrenheit). Since such temperatures can exceed those tolerable by standard electrical connectors, some sensor assemblies employ customized ceramic terminal assemblies having ceramic insulators to isolate the measurement leads from each other and the sensor housing, typically in cooperation with a potting composition disposed within the sensor to support the measurement leads. While generally acceptable for their intended purpose, the ceramic structures and/or the braze fixing the ceramic structures to the sensor housing can fracture. Heat conducted to the measurement leads can also cause embrittlement of the measurement leads over time, potentially resulting in the measurement lead developing an open circuit. To limit (or eliminate entirely) the reliability challenges posed by ceramic/braze fracture and lead embrittlement the sensor assembly 100 includes a housing 102 spaced apart from a mounting flange 104 and coupled thereto by an intermediate flange 106, allowing the sensor assembly 100 to communicate with the engine harness 22, e.g., through a standard circular electrical connector, and without customized, e.g., ceramic, terminal assemblies.

Figure 2:
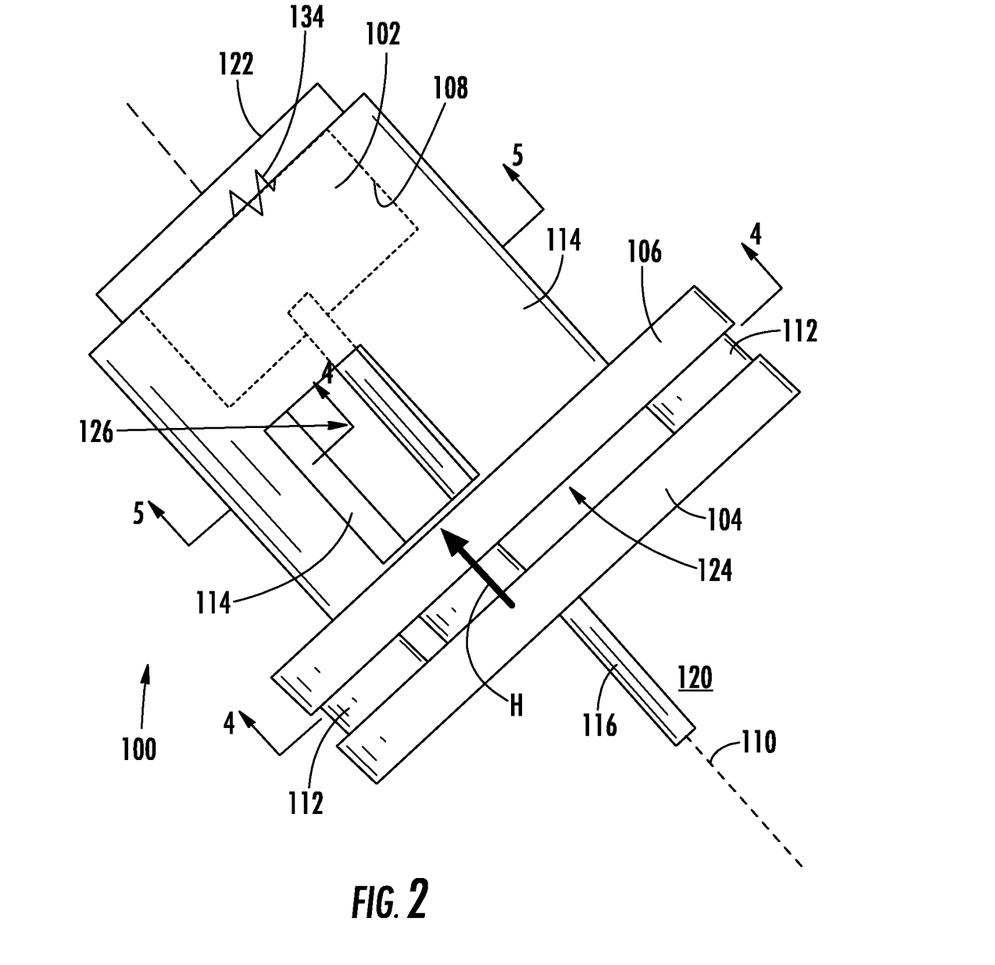
FIG. 2 is a perspective view of the sensor assembly of FIG. 1, showing a housing and a mounting flange spaced apart from one another along a sensor axis and coupled to one another by an intermediate flange.

With reference to FIG. 2, the sensor assembly 100 is shown. The sensor assembly 100 includes the housing 102. The housing 102 defines a potting chamber 108 and is arranged along a sensor axis 110. The mounting flange 104 extends about the sensor axis 110 and is axially offset along the sensor axis 110 from the housing 102. The intermediate flange 106 is arranged between the housing 102 and the mounting flange 104 along the sensor axis 110, the intermediate flange 106 coupling the mounting flange 104 to the housing 102. The intermediate flange 106 is spaced apart from mounting flange 104 to limit thermal communication H between the mounting flange 104 and the housing 102. Although shown in the illustrated example as described herein as having a single intermediate flange 106 it is to be understood and appreciated that the sensor assembly 100 can have more than one intermediate flange 106, as suitable for an intended application.

The sensor assembly 100 also includes point spacers 112, arcuate spacers 114, and a sensor 116. The sensor assembly 100 also includes sensor leads 118 (shown in FIG. 3), a potting body 120 (shown in FIG. 3), and an electrical connector 122. An inboard gap 124 is defined between the mounting flange 104 and the intermediate flange 106 to provide thermal separation between the housing 102 and the mounting flange 104 and/or heat removal from the sensor assembly 100. The thermal separation between the mounting flange 104 and housing 102 provided by the intermediate flange 106 limits heat conducted from the mounting flange 104, e.g., from the casing 18 (shown in FIG. 1), to the housing 102.

An outboard chamber 126 is defined between the intermediate flange 106 and the housing 102 to provide additional thermal separation between the intermediate flange 106 and the housing 102 and/or heat removal from the sensor assembly 100. Notably, the inboard gap 124 and the outboard chamber 126 reduce heat interaction between structures to which the sensor assembly 100 is mounted, e.g., the case 18 (shown in FIG. 1), and the housing 102, limiting temperature of the housing 102 by allowing the housing 102 run at temperatures lower than that of the mounting flange 104, e.g., below the rated operating temperature of MIL-STD electrical connectors.

The point spacers 112 are arranged between the mounting flange 104 and the intermediate flange 106. More specifically, the point spacers 112 are distributed circumferentially about the sensor axis 110, are radially offset from the sensor axis 110, and couple the mounting flange 104 to the intermediate flange 106. The inboard gap 124 is defined between the intermediate flange 106 and the mounting flange 104, the point spacers 112 bounding the inboard gap 124. The point spacers 112 define channels between one another for flow of fluid to communicate heat $H_{124}$ (shown in FIG. 4) away from the sensor assembly 100 by way of convection in addition to reducing heat conducted from the mounting flange 104 and the housing 102.

The arcuate spacers 114 are arranged between the intermediate flange 106 and the housing 102. In this respect the arcuate spacers 114 are distributed circumferentially about the sensor axis 110, are radially offset from the sensor axis 110, and couple the intermediate flange 106 to the housing 102. The outboard chamber 126 is defined between the intermediate flange 106 and the housing 102, the arcuate spacers 114 bounding the outboard chamber 126. The arcuate spacers 114 are arranged radially inward of the point spacers 112, have axial height greater than that of the point spacers 112, and define channels between one another for flow of fluid to communicate additional heat $H_{126}$ (shown in FIG. 5) away from the sensor assembly 100, also by way of convection. In certain embodiments the arcuate spacers 114 mount (i.e., fix) housing 102 to the intermediate flange 106, e.g., via welding, and may be machined with the housing 102 or the intermediate flange 106 from a common piece of stock. As will be appreciated by those of skill in the art in view of the present disclosure, this limits the number parts forming the sensor assembly 100. Although shown and described herein as arcuate spacers, sunray spacers extending directly radially from the sensor axis 110 can also be employed to couple the housing 102 to the intermediate flange 106, simplifying the fabrication of the sensor assembly 100.

The sensor 116 is fixed to the housing 102, is arranged along the sensor axis 110, and extends axially from within the potting chamber 108 to a location 128 on a side of the mounting flange 104 opposite the intermediate flange 106. In certain embodiments the sensor 116 includes a temperature measurement device, such as a thermocouple or a thermistor. In accordance with certain embodiments the sensor 116 can include a pressure gauge. It is also contemplated that the sensor 116 can include a flow meter or flow measurement device.

Figure 3:
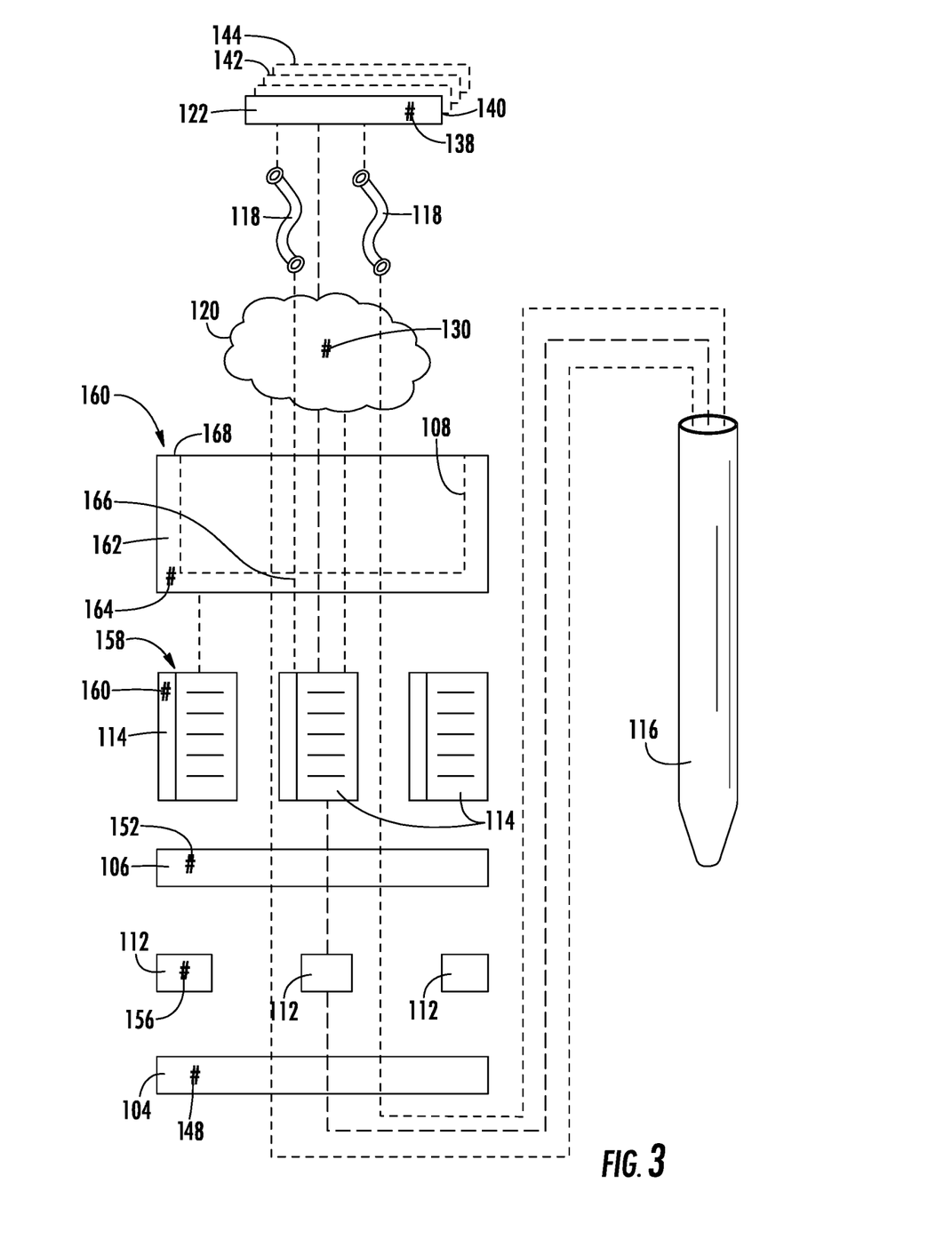
FIG. 3 is an exploded view of the sensor assembly of FIG. 1, showing the electrical connector and sensor leads exploded from a potting chamber defined within the housing.

The sensor leads 118 are arranged within the potting chamber 108 of the housing 102. In this respect an end of the sensor 116 extends into the potting chamber 108, the electrical connector 122 is fixed to the housing 102 opposite the sensor 116, and the sensor leads 118 electrically connects the sensor 116 to the electrical connector 122. The electrical connection provided by the sensor leads 118 provide electrical communication between the sensor 116 and the electrical connector 122, and therethrough to the controller 20 (shown in FIG. 1) through the engine harness 22 (shown in FIG. 1). As will be appreciated by those of skill in the art in view of the present disclosure, the thermal separation provided by the inboard gap 124 and the outboard chamber 126 also limit temperature of sensor leads 118, limiting (or eliminating entirely) the tendency of the sensor leads 118 to become embrittled and/or become electrically open during service.

The potting body 120 includes a potting material 130 and is disposed within the potting chamber 108. In this respect the potting body 120 mechanically supports the sensor leads 118 within the potting chamber 108, limiting movement of the sensor leads 118 from vibrational forces communicated to the sensor assembly 100 by the gas turbine engine 10 (shown in FIG. 1). In certain embodiments the potting material 130 includes a silicone-type potting compound, to which a ceramic grit material can be added, tolerant of relatively high temperatures. In accordance with certain embodiments the potting material 130 can include an epoxy-type or urethane-type epoxy compound less tolerant of high temperatures that silicon-type potting compounds. As will be appreciated by those will in the art, the thermal separation provided to the housing 102 by the inboard gap 124 and the outboard chamber 126 allows the housing 102 to remain far cooler than the mounting flange 104, allowing relatively inexpensive epoxy-type and urethane-type epoxies to form the potting body 120. For example, in certain embodiments the housing 102 can be more than 100 degrees Celsius (212 degree Fahrenheit) cooler than the mounting flange 104.

The electrical connector 122 has an electrical connector body 136 formed from an electrical connector material 138, is fixed to the housing 102 by the braze or weld 134 (shown in FIG. 2), and is electrically connected to the sensor leads 118. Electrical connection of the electrical connector 122 to the sensor leads 118 provides electrical communication between the sensor 116 and the controller 20 (shown in FIG. 1) through the engine harness 22 (shown in FIG. 1). Fixation of the electrical connector 122 to the housing 102 confines the potting body 120 within the potting chamber 108, protecting the electrical connections made by the sensor leads 118 within the potting chamber 108.

In certain embodiments the electrical connector 122 can include a standard electrical connector 140 (shown in FIG. 3), e.g., that is not customized and/or does not include a ceramic button or post structure, limiting cost of the sensor assembly 100. In certain embodiment the electrical connector 122 can include a circular electrical connector 142 (shown in FIG. 3), simplifying connection of the sensor assembly 100 to the engine harness 22 (shown in FIG. 1) by allowing the harness connector 24 (shown in FIG. 1) to also be a standard connector. In accordance with the electrical connector 122 can include a MIL-STD electrical connector 144 (shown in FIG. 3), e.g., conforming to Revision H of MIL-DTL-5015, simplifying the connection of the sensor assembly 100 to the engine harness 22. Examples of suitable standard electrical connector, circular electrical connectors, and MIL-STD electrical connectors include electrical connectors available from The Amphenol Corporation of Wallingford, Conn.

With reference to FIG. 3, the sensor assembly 100 is shown in an exploded view. The mounting flange 104 has mounting flange body 146 formed from a mounting flange material 148 and defining a mounting flange aperture 150 therethrough. It is contemplated that the mounting flange material 148 be tolerant of high temperatures, such as stainless steel. In certain embodiments the electrical connector material 138 can be different form the mounting flange material 148, the electrical connector material 138 being a material less tolerant of high temperatures such aluminum, aluminum alloy, or pot metal by way of non-limiting examples.

As will be appreciated by those of skill in the art in view of the present disclosure, the thermal separation provided by the inboard gap 124 (shown in FIG. 2) and the outboard chamber 126 (shown in FIG. 2) allow for employment of materials less tolerant to high temperatures than the mounting flange material 148 forming the mounting flange 104. The intermediate flange 106 is similar to the mounting flange 104 and is additionally formed from an intermediate flange material 152. In certain embodiments the intermediate flange material 152 is the same as the mounting flange material 148. In accordance with certain embodiments the intermediate flange material 152 can be different that the mounting flange material 148, reducing cost of the sensor assembly 100 by allowing for use of relatively low cost materials in comparison to the mounting flange material 148 less of tolerant of high temperatures, e.g., carbon steel by way of non-limiting example.

The point spacers 112 each have a cylindrical body 154 formed with a bore therethrough from a point spacer material 156. In certain embodiments the point spacer material 156 can be the same material used to form the mounting flange 104. In accordance with certain embodiments the point spacer material 156 can be different than the material forming the mounting flange 104, such as carbon steel by way of non-limiting example. The point spacers 112 can be formed using off-the-shelf components, such as stacked washers fastened between the mounting flange 104 and the intermediate flange 106, limiting cost of the sensor assembly 100. The arcuate spacers 114 are similar to the point spacers 112, and additionally have a monolithic arcuate spacer body 158 formed from an arcuate spacer material 160 fixed between the housing 102 and the intermediate flange 106, such as by brazing or welding. In certain embodiments the mounting flange 104, the point spacers 112, and the intermediate flange 106 can be formed a first monolithic body to which a second monolithic body, formed by the arcuate spacers 114 and housing 102, is coupled.

The housing 102 has a housing body 162 formed from a housing material 164 and having a sensor seat 166 and an axially opposite electrical connector seat 168. The sensor seat 166 is configured to fixedly receive therein the sensor 116. The sensor seat 166 is configured to fixedly receive thereon the electrical connector 122. In certain embodiments the housing material 164 is the same as the material forming the mounting flange 104. In accordance with certain embodiments the housing material 164 can be a material different than that forming the mounting flange 104, reducing cost of the sensor assembly 100 by allowing the housing to be formed from a (relatively low cost) material less tolerant of high temperatures than the mounting flange material 148.

Assembly of the sensor assembly 100 can be assembled by seating the sensor 116 in the sensor seat 166 and fixing the sensor 116 therein by fastening, welding, or brazing. The arcuate spacers 114 can thereafter be fixed to the housing 102, also by welding or brazing, and the intermediate flange 106 thereafter aligned to one another to receive, through the intermediate flange aperture 150, the sensor 116. Fixation to the arcuate spacers 114 can be, for example by welding or brazing. The point spacers 112 can be fixed to the intermediate flange 106, by fastening, welding, or brazing, and the mounting flange 104 thereafter fixed to the point spacers 112 by fastening, welding, or brazing once aligned to receive through the mounting flange aperture the sensor 116. In certain embodiments the sensor 116 can be assembled in the sensor assembly 100 subsequent to assembly of the mounting flange 104 to the housing 102 via the intermediate flange 106, the arcuate spacers 114, and the point spacers 106.

Electrical connections can thereafter be made by connecting the sensor leads 118 to the sensor 116 within the potting chamber 108 of the housing 102. The sensor leads 118 can then be electrically connected to the electrical connector 122, and the electrical connector 122 fixed to the housing 102, e.g., via fastening or with the braze or weld 134. Once the electrical connector 122 is fixed to the housing 102 the potting material 130 can be introduced into the housing 102 in an amount sufficient to support the sensor leads 118 within the potting chamber 108, e.g., via a fill-bore defined by the housing 102 fluidly coupling the potting chamber 108 with the ambient environment and sealed subsequent to introducing the potting material 130 into the potting chamber 108. As will be appreciated by those of skill in the art in view of the present disclosure, although described herein in a particular order, it is to be understood and appreciated that the order of the above operations can be altered and remain within the scope of the present disclosure.

Figure 4:
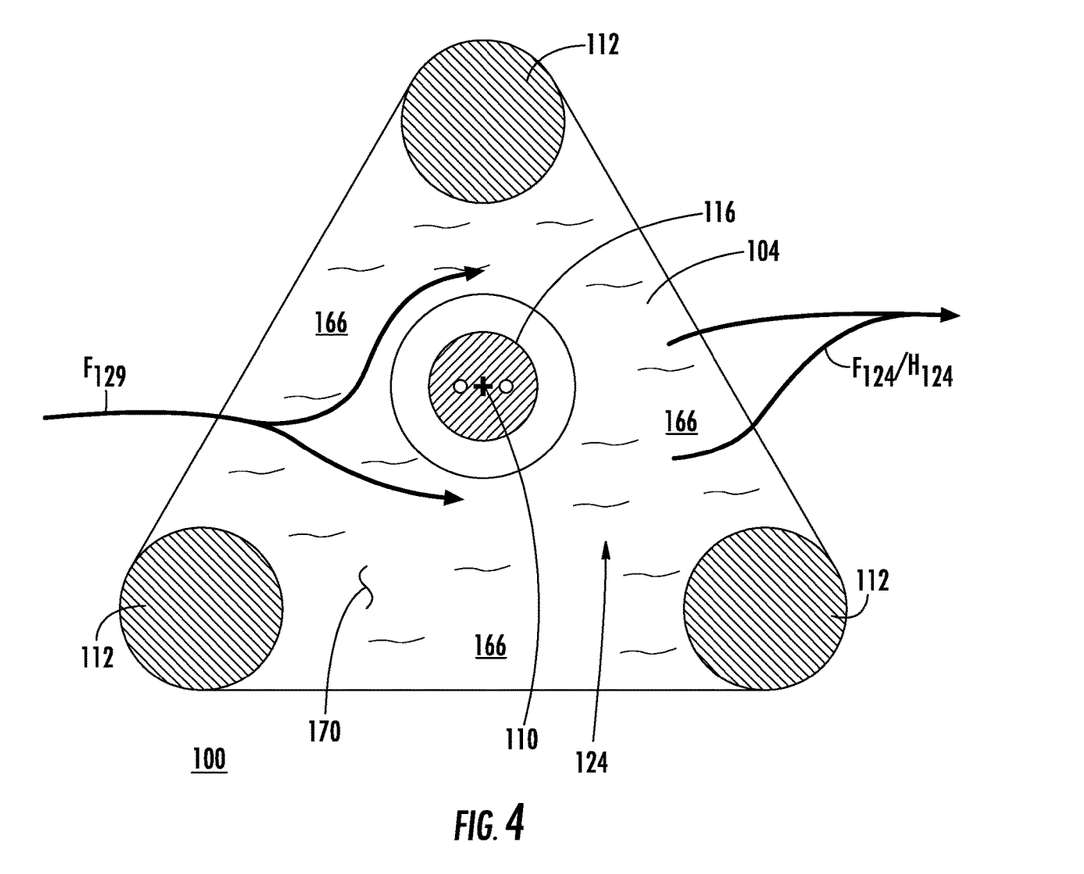
FIG. 4 is a cross-sectional view of the sensor assembly of FIG. 1, showing point standoffs and an inboard gap defined between the mounting flange and the intermediate flange.

With reference to FIG. 4, a portion of the sensor assembly 100 including the point spacers 112 and the mounting flange 104 is shown. As shown in FIG. 4 pairs of adjacent point spacers 112 define between one another inboard flow channels 166. The inboard flow channels 166 are arranged to admit and issue the inboard fluid flow $F_{124}$ into the inboard gap 124 for communication of heat $H_{124}$ from an upper surface 170 of the mounting flange 104 and a lower surface 172 (shown in FIG. 5) of the intermediate flange 106 (shown in FIG. 2). In the illustrated embodiment inboard flow channels 166 are distributed uniformly about the sensor axis 110 to admit and issue therethrough the inboard fluid flow 100, desensitizing the sensor assembly 100 to orientation about sensor axis 110 when fixed to the case 18 (shown in FIG. 1).

As shown and described herein the sensor assembly 100 includes three (3) point spacers 112 spaced apart from one another. The spacing is between the point spacers 112 is selected such fluid flowing through the inboard gap 124 limits thermal communication between the mounting flange 104 and the intermediate flange via convection. Further, the number and sizing of the point spacers 112 are selected to limit thermal conduction between the mounting flange 104 and the intermediate flange 106 via conduction, e.g., via a circular shape having a relative small cross-sectional area relative to the intermediate flange 106, and be simple to manufacture, e.g., via a circular shape. Although three (3) point spacers 112 are shown in FIG. 4 and described above, it is to be understood and appreciated that the sensor assembly 100 can include fewer than three (3) point spacers 112 or more than three (3) point spacers 112, as suitable for an intended application.

Figure 5:
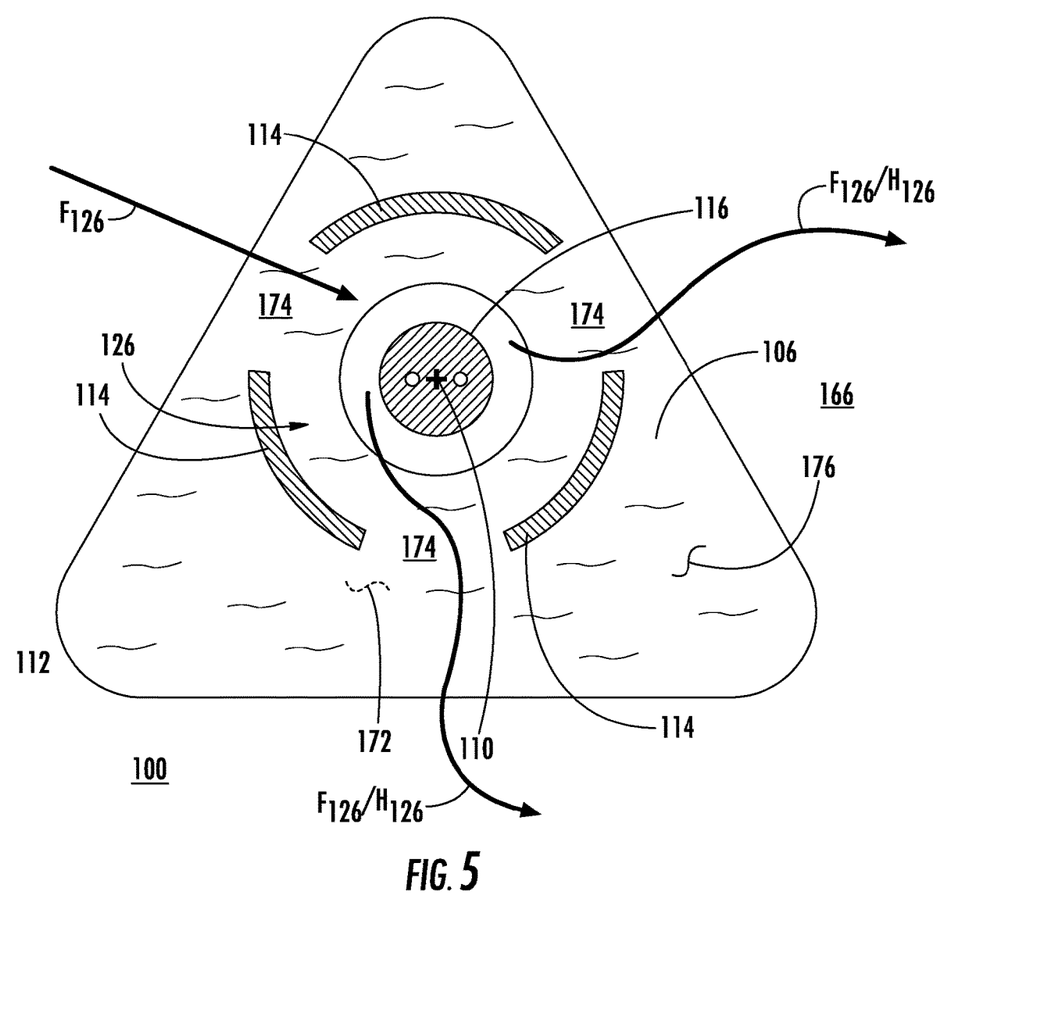
FIG. 5 is a cross-section view of the sensor assembly of FIG. 1, showing arcuate standoffs bounding an outboard chamber gap defined between the intermediate flange and the housing.

With reference to FIG. 5, a portion of the sensor assembly 100 including the arcuate spacers 114 and the intermediate flange 106 is shown. As shown in FIG. 5 pairs of adjacent arcuate spacers 114 define between one another outboard flow channels 174. The outboard flow channels 174 are arranged to admit and issue the outboard fluid flow $F_{126}$ into the outboard chamber 126 for communication of heat $H_{126}$ from an upper surface 176 of the intermediate flange 106 and a lower surface 178 (shown in FIG. 2) of the housing 102 (shown in FIG. 2). In the illustrated embodiment outboard flow channels 174 are distributed uniformly about the sensor axis 110 to admit and issue therethrough the outboard fluid flow $F_{126}$, also desensitizing the sensor assembly 100 to installation orientation about sensor axis 110 when fixed to the case 18 (shown in FIG. 1).

As shown and described herein the sensor assembly 100 includes three (3) arcuate spacers 114 with the outboard flow channels 174 therebetween. The width of the outboard flow channels 174 defined between circumferentially adjacent arcuate spacers 114 is selected such the chamber fluid $F_{126}$ flowing through the outboard flow channels 174 limits thermal communication between the intermediate flange 106 and the housing 102 via convection. Further, the number and sizing of the outboard flow channels 174 is selected to limit thermal conduction between the intermediate flange 106 and the housing 102 via conduction. Although three (3) arcuate spacers 114 are shown in FIG. 5 and described above, it is to be understood and appreciated that the sensor assembly 100 can include fewer than three (3) arcuate spacers 114 or more than three (3) arcuate spacers 114, as suitable for an intended application.

Figure 6:
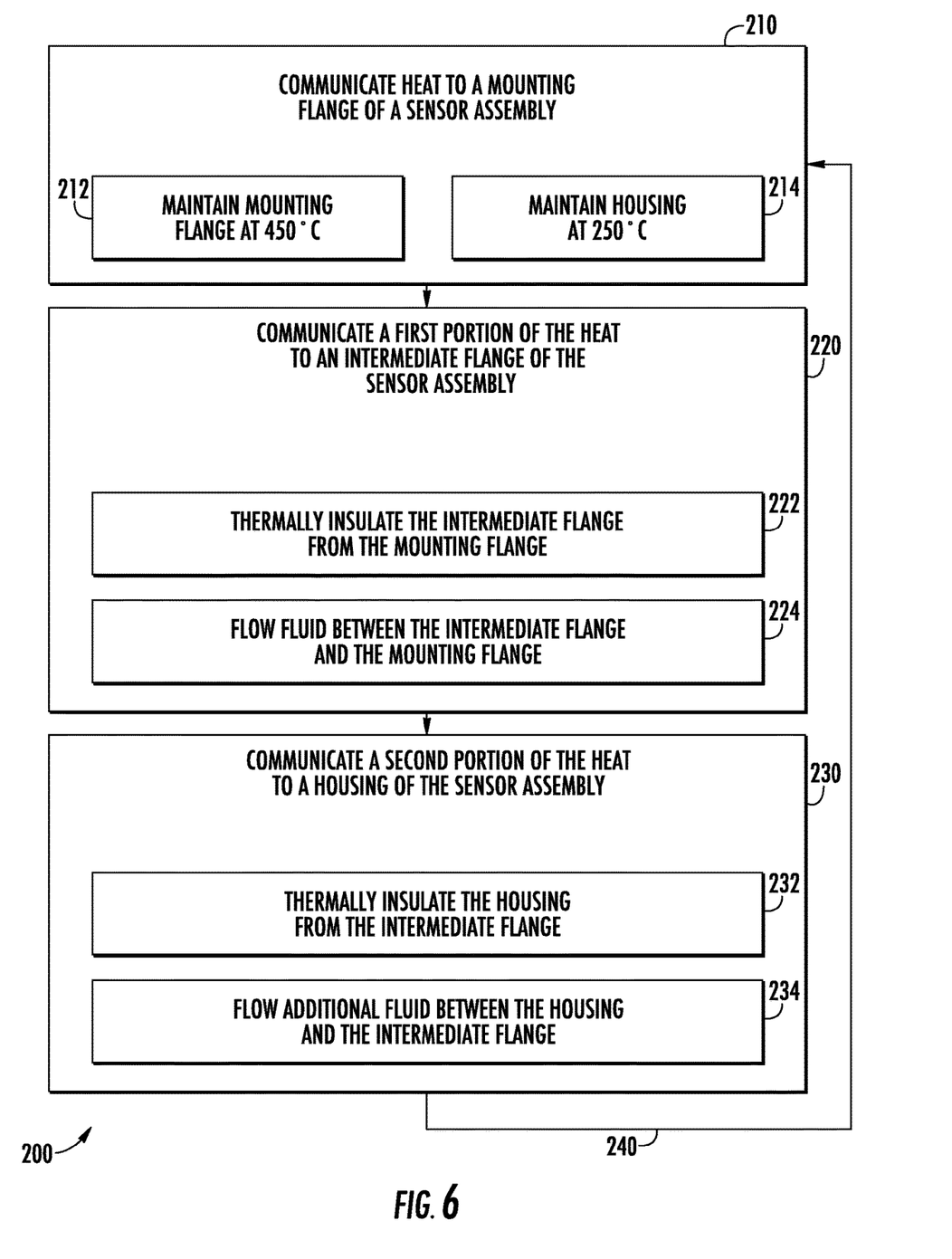
FIG. 6 is a block diagram of a method of cooling a sensor assembly according to an illustrative and non-limiting embodiment, showing operations of the method.

With reference to FIG. 6, a method 200 of cooling a sensor assembly, e.g., the sensor assembly 100, is shown. As shown with box 210, the sensor assembly is heated by communicating heat to a mounting flange, e.g., the mounting flange 104 (shown in FIG. 2). A first portion of the heat is communicated to an intermediate flange of the sensor assembly, e.g., the intermediate flange 106 (shown in FIG. 2), as shown with box 220. The intermediate flange is in turn thermally insulated from the mounting flange with a fluid, e.g., air, disposed between the mounting flange and the intermediate flange, as shown with box 222. In certain embodiments a fluid, e.g., flows between the mounting flange and the intermediate flange, as shown with box 224, the fluid limiting the amount of heat communicated to the intermediate flange.

As shown with box 230, a second portion of the heat is communicated to the housing from the intermediate flange, the second portion smaller than the first portion of the heat, as shown with box 230. The housing flange is in turn thermally separated from the intermediate flange with a fluid, e.g., air, disposed between the intermediate flange and the housing to limit thermal conduction therebetween, as shown with box 232. In certain embodiments a fluid, e.g., flows between the intermediate flange and the housing, as shown with box 234. Cooling can occur continuously during operation of a gas turbine engine, e.g., the gas turbine engine 10, to which the sensor assembly is attached, as shown with box 240.

In accordance with certain embodiments the method 200 can include heating the mounting flange comprises heating the mounting flange to a temperature of about 450 degrees Celsius (about 842 degree Fahrenheit) and cooling the housing to a temperature of about 250 degrees Celsius (about 482 degree Fahrenheit), as shown with boxes 212 and 214. As will be appreciated by those of skill in the art in view of the present disclosure, temperatures around these values allow the sensor assembly to be employ standard electrical connectors, e.g., the standard electrical connector 140 (shown in FIG. 2) and/or the MIL-STD electrical connector 144 (shown in FIG. 2), in applications where the temperature would otherwise exceed the temperature rating of the electrical connector.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A sensor assembly, comprising:
   a housing defining a potting chamber and arranged along a sensor axis;
   a mounting flange extending about the sensor axis and axially offset along the sensor axis from the housing;
   one or more intermediate flange arranged between the housing and the mounting flange along the sensor axis, the one or more intermediate flange coupling the mounting flange to the housing, wherein the one or more intermediate flange is spaced apart from the mounting flange to limit thermal communication between the mounting flange and the housing; and
   a plurality of point standoffs connecting the one or more intermediate flange to the mounting flange, the plurality of point standoffs defining an inboard gap between the one or more intermediate flange and mounting flange.

2. The sensor assembly as recited in claim 1, wherein the one or more intermediate flange is spaced apart from the housing to limit thermal communication between the mounting flange and the housing.

3. The sensor assembly as recited in claim 1, wherein the plurality of point standoffs are radially offset from the sensor axis.

4. The sensor assembly as recited in claim 1, wherein the plurality of point standoffs are distributed circumferentially about the sensor axis.

5. A sensor assembly, comprising:
   a housing defining a potting chamber and arranged along a sensor axis;
   a mounting flange extending about the sensor axis and axially offset along the sensor axis from the housing;
   one or more intermediate flange arranged between the housing and the mounting flange along the sensor axis, the one or more intermediate flange coupling the mounting flange to the housing, wherein the one or more intermediate flange is spaced apart from the mounting flange to limit thermal communication between the mounting flange and the housing; and
   a plurality of arcuate standoffs connecting the one or more intermediate flange to the housing, the plurality of arcuate standoffs defining an outboard chamber between the one or more intermediate flange and the housing.

6. The sensor assembly as recited in claim 5, wherein the plurality of arcuate standoffs are radially offset from the sensor axis.

7. The sensor assembly as recited in claim 5, wherein the plurality of arcuate standoffs are circumferentially distributed about the sensor axis, circumferentially adjacent arcuate standoffs defining flow channels therebetween.

8. The sensor assembly as recited in claim 1, further comprising an electrical connector axially opposite the one or more intermediate flange and connected to the housing.

9. The sensor assembly as recited in claim 8, wherein the electrical connector is welded or brazed to the housing.

10. The sensor assembly as recited in claim 8, wherein the electrical connector is a standard electrical connector, a circular electrical connector, or conforms to a MIL-STD specification.

11. The sensor assembly as recited in claim 1, further comprising a temperature sensor fixed to the housing and extending along the sensor axis to a location on a side of the mounting flange opposite the one or more intermediate flange.

12. The sensor assembly as recited in claim 1, further comprising:
   a sensor fixed to the housing and extending along the sensor axis;
   at least one sensor lead extending from the sensor and disposed within the potting chamber of the housing; and
   a potting body supporting the at least one sensor lead and thermally coupling the at least one sensor lead to the housing.

13. A gas turbine engine, comprising:
   a case enclosing at least one of a compressor, a combustor, and a turbine; and
   a sensor assembly as recited in claim 1, wherein the mounting flange of the sensor assembly is fixed to the case, the housing in thermal communication with the case through the mounting flange,
   wherein the sensor assembly further comprises a standard electrical connector axially opposite the one or more intermediate flange and connected to the housing.

14. The gas turbine engine as recited in claim 13, wherein the sensor assembly further comprises:
   a plurality of point standoffs connecting the mounting flange to the intermediate flange, the plurality of point standoffs defining an inboard gap between the mounting flange and the one or more intermediate flange, and
   a plurality of arcuate standoffs connecting the intermediate flange to the housing, the plurality of arcuate standoffs defining an outboard chamber between the one or more intermediate flange and the housing.

15. The gas turbine engine as recited in claim 13, wherein the sensor assembly further comprises a temperature sensor fixed to the housing and extending along the sensor axis to a location on a side of the mounting flange opposite the one or more intermediate flange.

16. A method of cooling a sensor assembly, comprising:
   at a sensor assembly including a housing defining a potting chamber and arranged along a sensor axis, a mounting flange extending about the sensor axis and axially offset along the sensor axis from the housing, one or more intermediate flange arranged between the housing and the mounting flange along the sensor axis, the one or more intermediate flange coupling the mounting flange to the housing and spaced apart from mounting flange, communicating heat to the mounting flange of the sensor assembly;

thermally separating the one or more intermediate flange from the mounting flange with a fluid disposed between the mounting flange and the one or more intermediate flange; and thermally separating the housing from the one or more intermediate flange with additional fluid disposed between the intermediate flange and the housing.

17. The method as recited in claim 16, further comprising:

flowing the fluid between the mounting flange and the one or more intermediate flange; and flowing the additional fluid between the one or more intermediate flange and the housing.

18. The method as recited in claim 16, further comprising:

communicating a first portion of the heat to the one or more intermediate flange of the sensor assembly; and communicating a second portion of the heat to the housing of the sensor assembly, the second portion of the heat being smaller than the first portion of the heat.

19. The method as recited in claim 16, wherein heating the mounting flange comprises heating the mounting flange to a temperature of about 450 degrees Celsius (about 842 degree Fahrenheit), the method further comprising cooling the housing to a temperature of about 200 degrees Celsius (about 392 degree Fahrenheit).

* * * * *